United States Patent Office 2,762,834
Patented Sept. 11, 1956

2,762,834

PRODUCTION OF ACRYLONITRILE

James F. Gabbett, Jr., Allston, and Nat C. Robertson, Wellesley, Mass., assignors to National Research Corporation, Cambridge, Mass., a corporation of Massachusetts No Drawing. Application September 24, 1953,
Serial No. 382,199

5 Claims. (Cl. 260—465.3)

This invention relates to an improved catalyst and process for the production of acrylonitrile.

A principal object of the present invention is to produce high yields of acrylonitrile readily and cheaply by reacting hydrogen cyanide with acetylene in the presence of an improved catalyst.

Another object of the invention is to provide an improved catalyst for use in the production of acrylonitrile from hydrogen cyanide and acetylene to give high yields of acrylonitrile with low yields of propionitrile.

Other objects of the invention will in part be obvious and will in part appear hereinafter.

The invention accordingly comprises the process involving the several steps and the relation and the order of one or more of such steps with respect to each of the others, which are exemplified in the following detailed disclosure, and the scope of the application of which will be indicated in the claims.

For a fuller understanding of the nature and objects of the invention, reference should be had to the following detailed description.

It is well known that acrylonitrile can be prepared by reacting hydrogen cyanide with acetylene in the vapor phase in the presence of a suitable catalyst. Many catalysts have been reported as suitable for this reaction and include such materials as activated carbon, silica gel, and solid, porous materials, having either a high surface activity or little or no surface activity, impregnated with alkali metal cyanides or hydroxides or mixtures of alkali metal cyanides, etc.

The present invention is directed to the catalytic vapor phase production of acrylonitrile from hydrogen cyanide and acetylene, and in particular, to an improved catalyst for the reaction. The present invention is particularly directed to obtaining high yields of acrylonitrile with low yields of propionitrile. The process of the present invention consists of reacting a mixture of hydrogen cyanide and acetylene in the vapor phase in the presence of a porous support consisting essentially of deoxygenated charcoal impregnated with from about 3% to 15% by weight of an alkali metal hydroxide, cyanide or carbonate. In a preferred embodiment, the deoxygenated charcoal is impregnated with about 10 per cent by weight of an alkali metal hydroxide, the preferred alkali metal hydroxide being sodium hydroxide.

In a preferred aspect of the invention, the porous support is a softwood charcoal due to its lower cost. This charcoal is conditioned for use as the catalyst support by heating to a temperature in the range 500°–900° C. and passing hydrogen over the heated charcoal until substantially all the oxygen has been removed. This procedure is also beneficial in removing other materials, such as tars, methane, etc., which would not be desirable in the product. The resulting deoxygenated charcoal is then impregnated with an alkali metal hydroxide, cyanide or carbonate.

In one preferred embodiment of the invention, high yields of acrylonitrile are obtained by reacting hydrogen cyanide and acetylene in the presence of the preferred improved catalyst at temperatures on the order of 450° C. to 700° C. It is also preferred, in order to obtain high yields of acrylonitrile with low yields of propionitrile, to carry out the reaction in the absence of hydrogen.

A more detailed disclosure of one method of producing acrylonitrile by use of the improved deoxygenated porous charcoal catalyst is illustrated in the following example which is set forth only for the purpose of illustration and is not to be construed as limiting the invention in any way.

*Example I*

65 grams of a granular unactivated wood charcoal was heated, at atmospheric pressure, to a temperature of about 600° C. in a stream of hydrogen for 48 hours. Water and other oxygenated products formed during this conditioning were removed. Upon completion of the hydrogen treatment, it was noted that the charcoal had lost 16 grams (24.6%) of its original weight. The deoxygenated charcoal was then impregnated with an aqueous solution containing about 4.9 grams of sodium hydroxide to provide, after drying, about 10% by weight of sodium hydroxide in the charcoal. A mixture of acetylene and hydrogen cyanide was passed through a Vycor reactor tube containing 54.4 grams of the prepared catalyst. The tube was heated to a temperature of about 640° C. and the gases passed through the reactor tube at a space velocity of about 527 hr.$^{-1}$ (STP). The mole ratio of acetylene to hydrogen cyanide was 1.52:1 with the amount of acetylene in the feed stream amounting to 8.50% and the pressure being substantially atmospheric. The remainder of the acetylene stream consisted of nitrogen as a diluent. The conversion of hydrogen cyanide to acrylonitrile was 51.2%, while the yield was 98.8% based on hydrogen cyanide.

The temperature at which the unactivated charcoal is heated during the hydrogen treatment may be varied considerably. However, it is best maintained between 500° C. and 900° C. and preferably around 700° C. The time necessary to substantially deoxygenate the unactivated charcoal will also vary, depending on such things as the type of unactivated charcoal employed, and the temperature. In general, the deoxygenation treatment takes more than 8 hours and preferably between about 12 and 24 hours. The deoxygenation treatment is preferably performed at substantially atmospheric pressure.

Either softwood or hardwood charcoals have been found to be satisfactory; however, from an economic standpoint, softwood charcoals are preferable. Samples of soft and hardwood charcoals obtained from leading producers of charcoal were tested before and after deoxygenation with hydrogen. The charcoals which had not been deoxygenated in no instance produced yields of acrylonitrile above 50% when using dilute acetylene streams containing nitrogen as the diluent, as illustrated in Example V. These wood charcoal samples on treatment with hydrogen were found to suffer a weight loss of from 20% to 40%. Although the preferred reducing agent is hydrogen, other reducing agents capable of deoxygenating the unactivated charcoal may be utilized.

It should also be mentioned that satisfactory catalysts may be produced by impregnating the charcoals either before or after being deoxygenated. However, it has been found preferable to impregnate the charcoal after it has been deoxygenated. Charcoal impregnated with alkali and then deoxygenated tends to lose some alkali, thus becoming less effective as a catalyst.

The deoxygenated charcoal may be impregnated with from about 3–15% by weight of either an alkali metal hydroxide, cyanide or carbonate. Best results have been obtained, however, when the treated charcoal has been impregnated with about 10% by weight of the desired alkali metal hydroxide, cyanide or carbonate. In one particular aspect of the invention, it has been found preferable to employ a deoxygenated charcoal impregnated with about 10% by weight of an alkali metal hydroxide which is preferably sodium or potassium hydroxide. Mixtures of alkali metal compounds may also be used.

Several other examples of the invention are set forth below.

Example II

This run was similar to that of Example I but a mixture of acetylene and hydrogen cyanide, having a mole ratio of 1.45:1, was passed through the catalyst tube heated to a temperature of about 610° C. at a rate of 392 hr.$^{-1}$ (STP). The amount of acetylene in the feed stream was about 11.3%, with the remainder of the feed stream consisting of nitrogen. The conversion of hydrogen cyanide to acrylonitrile amounted to 67.2%, while the yield was 96.0% based on hydrogen cyanide.

Example III

This run was similar to that of Example I, but the mole ratio of acetylene to hydrogen cyanide was 1.38:1. The reactor tube was heated to a temperature of about 630° C. and the space velocity was 517 hr.$^{-1}$ (STP). The amount of acetylene in the feed stream was about 8.67%, with the remainder of the feed stream consisting of nitrogen. The conversion of hydrogen cyanide to acrylonitrile amounted to 64.8%, while the yield was 95.3% based on hydrogen cyanide.

Example IV

This run was similar to that of Example I, but the mole ratio of acetylene to hydrogen cyanide was 1.03:1. The reactor tube was heated to a temperature of about 640° C. and the space velocity was 507 hr.$^{-1}$ (STP). The amount of acetylene in the feed stream was about 6.44%, with the remainder of the feed stream consisting of nitrogen. The conversion of hydrogen cyanide to acrylonitrile was 43.3%, while the yield was 85.0% based on hydrogen cyanide.

Example V

This run was similar to that of Example I except that, in this case, the unactivated wood charcoal was not deoxygenated. The mixture of acetylene and hydrogen cyanide in a mole ratio of 1.33:1 was passed through the catalyst tube heated to a temperature of about 600° C. at a rate of 435 hr.$^{-1}$ (STP). The amount of acetylene in the feed stream was about 8.43%, with the remainder consisting of nitrogen as a diluent. The conversion of hydrogen cyanide to acrylonitrile amounted to 37.8%, while the yield was 39.7% based on hydrogen cyanide.

As previously mentioned, the catalyst support consists of a porous body consisting essentially of wood charcoal. From the standpoint of cheapness, the preferred material is a soft-wood charcoal due to its relatively low cost. While the effect of the deoxygenation is very apparent, the exact reasons for the increased yields are not completely clear. However, when ordinary commercial unactivated wood charcoal is utilized, as is illustrated in Example V, the conversions and yields based on hydrogen cyanide are drastically less than those given in Examples 1 through 4. Thus, when utilizing wood charcoals under essentially identical conditions other than the deoxygenation treatment, it was learned that substantial quantities of the hydrogen cyanide could not be accounted for either as product or recovered material. It was shown by mass spectrometric analysis that this hydrogen cyanide was converted to oxygenated products, such as nitric oxide, carbon monoxide and water. In the present invention, essentially all of the oxygen is removed from the porous carbon support prior to its use as a catalyst. Accordingly, this oxidation of the hydrogen cyanide is substantially eliminated and higher yields and higher conversions are obtained.

In the above examples, specific operating conditions have been given. As mentioned previously, these are subject to considerable variation without departing from the scope of the invention. For example, the temperature range in the reactor may vary from about 450° C. to about 700° C. The pressure range in the reactor may vary from about atmospheric pressure to about 100 p. s. i. Equally, the molar ratio of acetylene to hydrogen cyanide may be varied quite widely between about 1:1 to about 1.6:1 and higher. Preferred molar ratios of acetylene to hydrogen cyanide are on the order of about 1.4 to 1. Equally, the space velocity may range from about 100 hr.$^{-1}$ to about 1000 hr.$^{-1}$, preferred space velocities being on the order of 500 hr.$^{-1}$ (STP). Equally, numerous other catalysts, such as the alkali metal cyanides and carbonates, can be employed in the reaction.

In the examples cited above, dilute streams of acetylene were employed. The amount of acetylene in these streams was less than 15%. The above examples illustrating the use of acetylene streams containing 11.3%, 8.50%, 8.67%, and 6.44% show that high yields of acrylonitrile can be obtained from dilute acetylene streams in the presence of the preferred improved catalyst. Although this invention has been described in connection with the use of dilute acetylene streams, it is also applicable to concentrated acetylene streams.

As mentioned previously, the presence of hydrogen in the reacting gas stream has a very deleterious effect upon the yield of acrylonitrile. When other conditions are the same, the yield of acrylonitrile, in the presence of hydrogen, drops from about 96% or above to 60% or 70%, the loss in acrylonitrile being accounted for by an increase in the yield of the relatively undesirable propionitrile. Accordingly, the catalyst of the present invention is preferably employed with a gas stream which is essentially free of hydrogen.

Since certain changes may be made in the above process without departing from the scope of the invention herein involved, it is intended that all matter contained in the above description shall be interpreted as illustrative and not in a limiting sense.

What is claimed is:

1. The process of producing acrylonitrile from hydrogen cyanide and acetylene which comprises heating unactivated charcoal to a temperature above about 500° C., passing hydrogen over said heated charcoal until substantially all the oxygen has been removed from said charcoal, impregnating said deoxygenated charcoal with a compound from the group consisting of the alkali metal hydroxides, cyanides, and carbonates, passing hydrogen cyanide and acetylene over the thus prepared catalyst at a temperature within the range of 500° C.–700° C.

2. The process according to claim 1 wherein said porous charcoal support is impregnated with from 3% to 15% by weight of sodium hydroxide.

3. The process according to claim 1 wherein said acetylene stream contains less than about 15% acetylene.

4. The method of claim 1 wherein said unactivated charcoal is heated at a temperature of about 600° C.

5. The process of preparing acrylonitrile by reacting hydrogen cyanide with acetylene which comprises deoxygenating a porous charcoal support, said deoxygenation being accomplished by heating said charcoal support in a reducing atmosphere to a temperature above about 500° C. to remove substantially all of the oxygen from said charcoal support, impregnating said deoxygenated support with a minor percentage of a compound selected from the group consisting of the alkali metal hydroxides, cyanides and carbonates, passing hydrogen cyanide and acetylene over the thus prepared catalyst at a temperature within the range of 500° C.–700° C.

References Cited in the file of this patent

UNITED STATES PATENTS

| | | |
|---|---|---|
| 2,413,496 | Green et al. | Dec. 31, 1946 |
| 2,419,186 | Harris et al. | Apr. 15, 1947 |

FOREIGN PATENTS

| | | |
|---|---|---|
| 584,662 | Great Britain | Jan. 20, 1947 |